INVENTOR.
RICHARD H. JONES.
BY
Wallace P. Lamb
ATTORNEY.

Oct. 11, 1960 R. H. JONES 2,955,758

ROTARY READ-OUT AND STORAGE DEVICE

Filed June 3, 1958 3 Sheets-Sheet 2

INVENTOR.
RICHARD H. JONES.
BY
Wallace P. Lamb
ATTORNEY.

INVENTOR.
RICHARD H. JONES.
BY
Wallace P. Lamb
ATTORNEY.

United States Patent Office 2,955,758

Patented Oct. 11, 1960

2,955,758

ROTARY READ-OUT AND STORAGE DEVICE

Richard H. Jones, King of Prussia, Pa., assignor to Burroughs Corporation, Detroit, Mich., a corporation of Michigan Filed June 3, 1958, Ser. No. 739,567

8 Claims. (Cl. 235—161)

This invention relates generally to calculating machines and particularly to a rotary read-out and storage device therefor.

As is well known in the business machine industry, electro-mechanical multiplying machines usually comprise, in general, keyboard indexed, differentially movable racks, a number read-out and storage device that is operatively connected to convert the mechanical movements of the racks to operate electrical switches for a partial products electrical calculator whence the partial products are transmitted to an accumulator and the product determined. Various types of read-out devices have been proposed in the past including both mechanical and electrical types, but none have met the needs of both compactness and speed of operation required for multiplying machines. For example, certain types of known electro-mechanical read-out devices are satisfactory with respect to their speed of operation, but are not capable of storing both the multiplicand and the multiplier factors for subsequent use in a multiplying routine. Other types of read-out devices include the mechanical type that transmits the multiplicand and multiplier to mechanical storage units for subsequent transmission to an electrical partial products calculator. This type is expensive and undesirably large for association with other components of machines in which space is a critical factor, and in addition is too slow in operation for the efficiency demands of multiplying machines. The ideal read-out device is one which is compact, of high speed operation and capable of storing both the multiplicand and multiplier, and it is the principal object of this invention to provide such a read-out device.

Another object of the present invention is to provide an improved read-out and storage device for a calculating machine.

Another object of the invention is to provide an improved device for reading-out numbers, that are key indexed into a machine, such as a multiplicand and a multiplier, in such manner that both are stored for transmission electrically in the performance of a multiplying routine.

Another object of the invention is to provide a dual rotary read-out device of a character and arrangement such that certain operating components of the device are housed by other operating components to effect a compact unit.

Another object resides in the provision of separately operable interspersed detents to control operation of the rotary read-out devices.

Other objects of the invention will become apparent from the following detailed description, taken in connection with the accompanying drawings in which.

Figure 1:
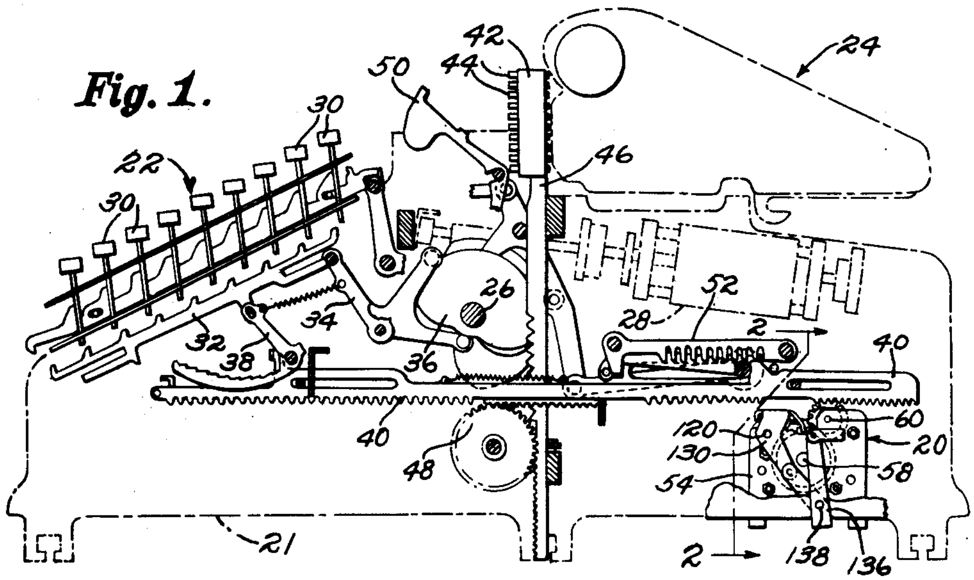
Fig. 1 is a side view of a calculating machine embodying features of the invention.

Referring first to Fig. 1, my read-out device, designated generally by the numeral 20, is adapted to read-out information that is indexed by key operation in a calculating machine and is for use particularly with a calculating machine having a multiplying operation, such as is shown in the patent to Hugh L. Clary et al., No. 2,403,480. In Fig. 1, only those components of an adding machine are shown which illustrate how a multiplicand and a multiplier may be indexed into the machine to be read-out by my improved read-out device 20. For a further understanding of the details of the machine, of Fig. 1, reference may be had to the patent to Butler, No. 2,629,549.

With reference to the components of the machine shown in Fig. 1, a frame 21 supports the machine components which include a keyboard 22, a platen carriage 24, and a main camshaft 26. In the conventional manner, the keyboard 22 is mounted on the frame 21 forwardly of the camshaft 26 and the carriage 24 rearwardly thereof. An electric motor 28 drives the main camshaft 26 and may also be employed to drive the carriage 24.

The keyboard 22 has the conventional rows of amount keys 30, only one row of which is shown, representing different digit orders. As is well known, such keyboards also include a motor bar key to initiate a cycle of operation of the camshaft 26 which, actuates, as well as controls, various operations of the machine.

Beneath the keyboard 22 is a plurality of parallel index slides 32 respectively for the row of keys 30, the slides 32 being movable respectively by cam follower levers 34 that are actuated by cams 36 on the main cam shaft 26. Movement of the slides 32 is limited by the stems of depressed keys and such movements are transmitted through index levers 38 respectively to a plurality of differentially movable amount racks 40.

Forwardly of and adjacent the platen of carriage 24 is a plurality of laterally positioned print heads 42 each of which carries print elements 44. The print heads 42 are respectively secured to the upper ends of a plurality of vertically movable bars 46 which are respectively moved by the racks 40 through pinion gears 48, to position the print elements 44, corresponding to the keys depressed, in printing relation to the platen. A plurality of pivoted print hammers 50 (pivoted on the frame 20) are located forwardly of the print heads 42 and are actuated under control of camshaft 26 to effect the printing operation. Each of the racks 40 is provided with a well-known lock rack 52 which holds the racks 40 against movement during the print operation.

Mounted on the frame 21 at the rear of the machine is my improved read-out device 20 for reading out and storing amounts represented by the positions of the amount racks 40. The read-out device 20 has an elongated supporting means or casing including end plates 54 that are connected together by and support a plurality of rods 56 which extend longitudinally through the casing. Also supported on the casing end plates 54 is a pair of parallel fixed shafts including a lower shaft 58 within the casing and an upper shaft 60 without the casing, above the top wall thereof.

Mounted on the shafts 58 and 60 in spaced apart relation therealong is a plurality of rotary read-out devices 62, one for each of the amount racks 40. Each of the rotary read-out devices 62 comprises, in general, a multiplicand storage switch 63 and a multiplier storage switch 65. Pinions 64, freely rotatable on the upper shaft 60 mesh with teeth on the lower edges of the amount racks 40 such that the pinions are rotated respectively by the differentially movable racks.

Figure 4:
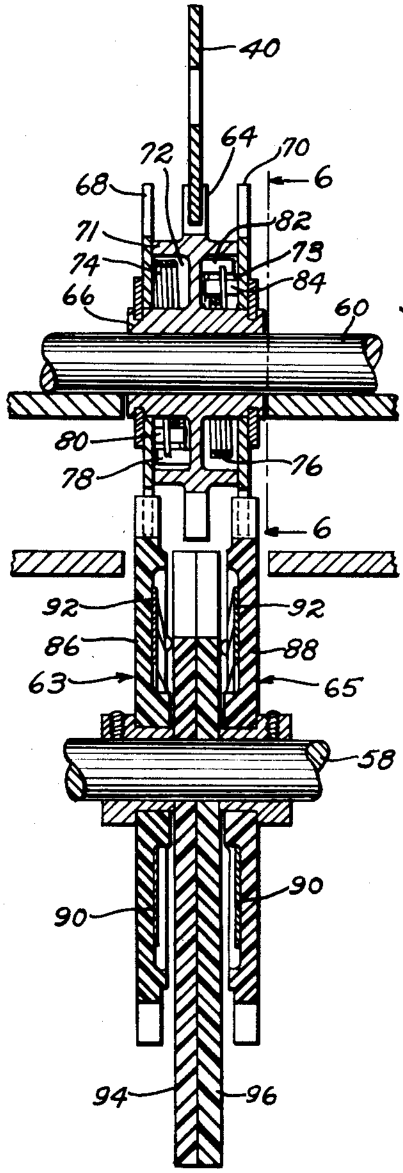
Fig. 4 is an enlarged vertical sectional view, taken along line 4—4 of Fig. 3.
Figure 6:
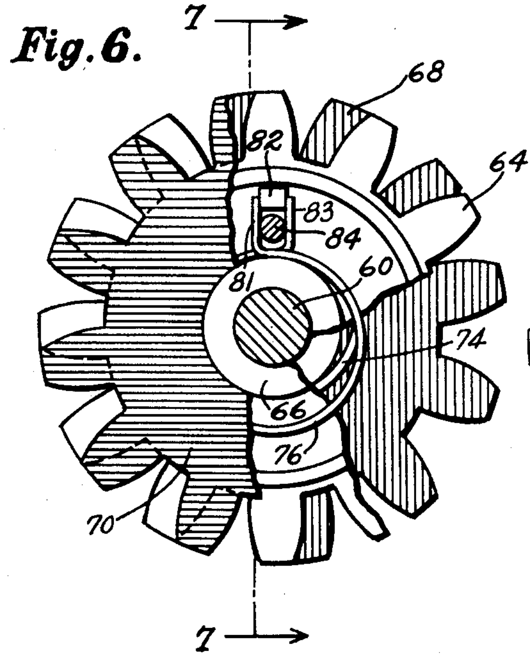
Fig. 6 is a sectional view, taken substantially along the line 6—6 of Fig. 4.
Figure 8:
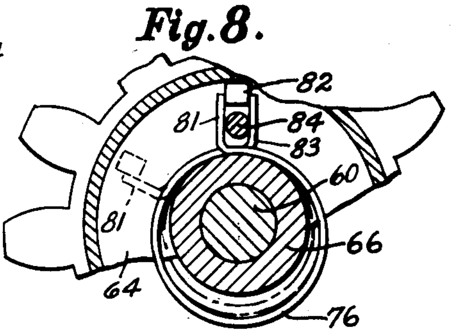
Fig. 8 is a cross sectional view partly in elevation and taken along the line 8—8 of Fig. 7.
Figure 7:
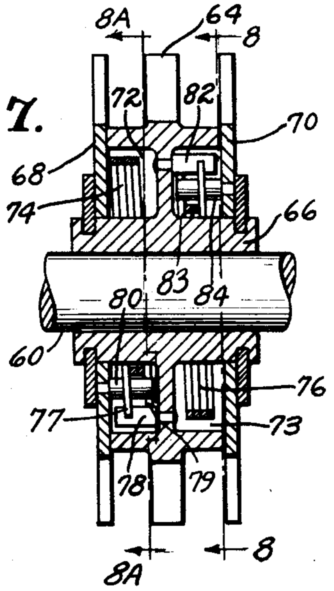
Fig. 7 is a sectional view, taken along line 7—7 of Fig. 6.
Figure 9:
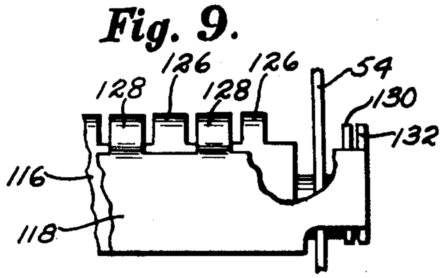
Fig. 9 is a fragmentary view in plan of certain other details of the read-out device.

As the rotary read-out devices 62 are alike, a detail description of one of them is deemed sufficient. With particular reference to Fig. 4, it will be seen that the pinion 64 has an inner hub 66 that receives shaft 60 and rotatably mounted on the hub 66 on opposite sides of the pinion 64 is a pair of gears 68 and 70. An outer hub 71, concentric with hub 66, cooperates therewith and with the inner faces of the gears to provide closed annular compartments 72 and 73 in which a pair of coiled torsion springs 74 and 76 are respectively housed. Spring 74 is coiled about the pinion hub 66 having one end portion abutting a square stud 78 carried by pinion 64 and the other end portion abutting a stud 80 carried by gear 68. Similarly, the other spring 76 is coiled about the pinion hub 66 having one end portion abutting a square stud 82, carried by pinion 64, and having the other end portion abutting a pin 84, carried by the gear 70 (see Fig. 6). The springs 74 and 76 are alike and are floating springs in the sense that both ends of each are free, i.e., the ends of the springs are not anchored. As shown in Fig. 8, the opposite end portions of spring 76 are outturned and held spaced apart by the studs 82 and 84 which are disposed between the spring end portions 81 and 83, as shown. The pinion 64 and gear 70 have normal or home positions in which their respective studs 82 and 84 are in alignment in spaced relation on a common radial line, and the spring 76 is pretensioned sufficiently to hold the stud 84 in alignment with stud 82. The studs 82 and 84 are held in alignment because the end portions of the spring 76 each act on opposite sides of the studs in opposing relation to effect a neutralizing spring action. As the end portions 81 and 83 of the spring 76 each engage both of the corresponding sides of the pair of studs 82, 84, it will be seen that rotation of pinion 64 in either direction will result in stud 82 carrying the corresponding one of the spring end portions in like direction to store a force in the spring 76. Thus, spring 76 is a bi-directional spring in the sense that a force may be stored therein upon rotation of pinion 64 in either direction. The above also applies to the other spring 74.

The gears 68 and 70 mesh respectively with a pair of laterally spaced gears 86 and 88 that are freely rotatable on the shaft 58. On each of the opposed faces of the gears 86 and 88 is attached respectively a pair of diametrically oppositely disposed electrical contact members 90 and 92 which are preferably arcuate in shape, as shown. The contact members 90 and 92 are cooperable respectively with printed circuit contacts on the opposite faces of a pair of back to back cards 94 and 96 which are interposed between the gears 86 and 88. Aligning apertures 98 in the printed circuit cards 94 and 96 are provided to receive shaft 58 and apertures 100 are provided to receive retainer rods 56. To retain the cards 94 and 96 in proper relationship to the contact members 90 and 92, the rods 56 are provided each with a retainer strip 102 that extends along the periphery thereof parallel to the longitudinal axis of the rods to engage in slots 104 provided in the cards to thus hold the cards against appreciable movement.

Figure 3:
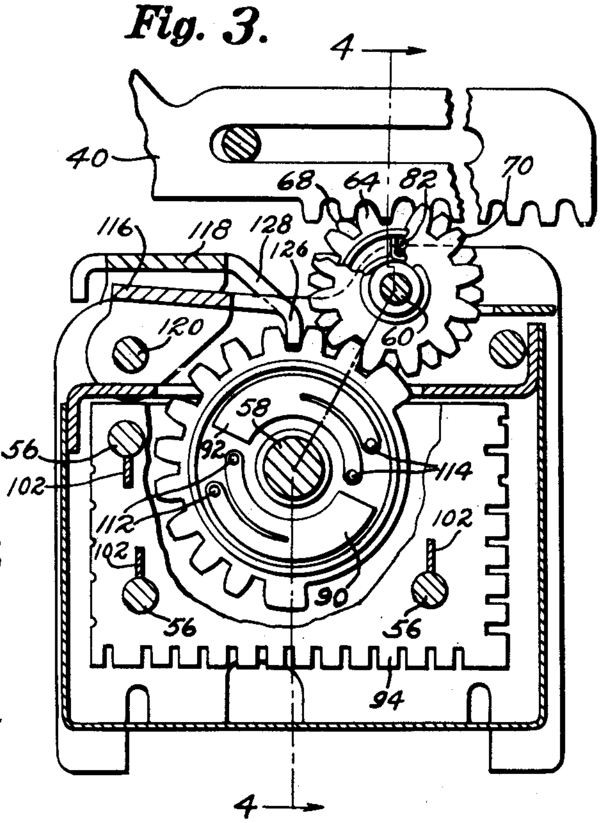
Fig. 3 is a cross sectional view, taken along line 3—3 of Fig. 2.
Figure 5:
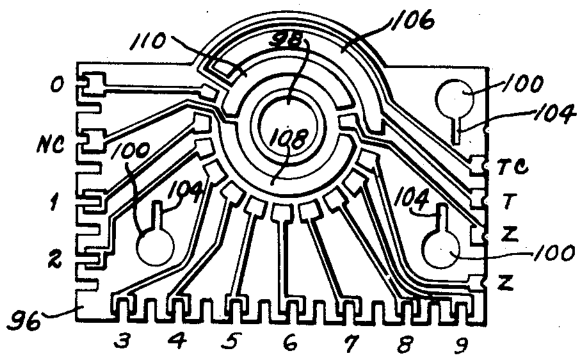
Fig. 5 is an elevational view of a printed circuit component of the rotary read-out device shown removed therefrom.

The circuit cards 94 and 96 are of dielectric material and may have printed circuits of any desired type thereon. In the present illustration, each card has a plurality of circuit terminals representing sequential numbers "0" to "9," a number common return "NC," auxiliary zeros "Z," and terminals "T" and "TC" for test purposes to by-pass number selection. All of the terminals pass through the card to terminal posts (not shown) to which circuit connections are made. The terminal posts are electrically connected by printed wire leads to two concentric segmental rings which encircle the shaft receiving apertures 98. As shown, the outer segmental ring comprises an arcuate row of switch contacts corresponding to terminals "0" to "9" plus the auxiliary contact "Z" and the segmental contact 106 corresponds to terminal "T." The inner segmental ring comprises two substantially semi-circular segments 108 and 110, the former being connected to the "NC" terminal as the common return for the numbers circuits, and the latter being the return of the test circuit. The contacts on the cards 96 are the fixed contacts that are selectively engaged by the contact members 90 and 92 on the gears 68 and 70. Preferably, each of the rotatable contact members 90 and 92 has a free resilient end which is bifurcated, as shown in Fig. 3. The bifurcated ends of contact member 90 carry a pair of electrical contacts 112 which are arranged such that the outer of the contacts 112 ride on the fixed contacts 106 of the printed circuit and the inner of the contacts on the common number return contact 110. Similarly, the bifurcated ends of contact member 92 carry a pair of electrical contacts 114 of which the inner contact rides on fixed contact 108 and the outer on the number contacts.

A number indexed on the keyboard 22 and represented by movement of the racks 40 is stored in the form of torsion forces in the springs 74 and 76 for subsequent operation of the corresponding rotary multiplicand and multiplier switches 63 and 65. To provide for storage of the number in the springs 74 and 76 as torsion forces, and to control the release thereof, a pair of detents 116 and 118 are provided which normally engage and hold gears 86 and 88 against rotation and thus control operation of the multiplicand switch 63 and the multiplier switch 65.

Figure 2:
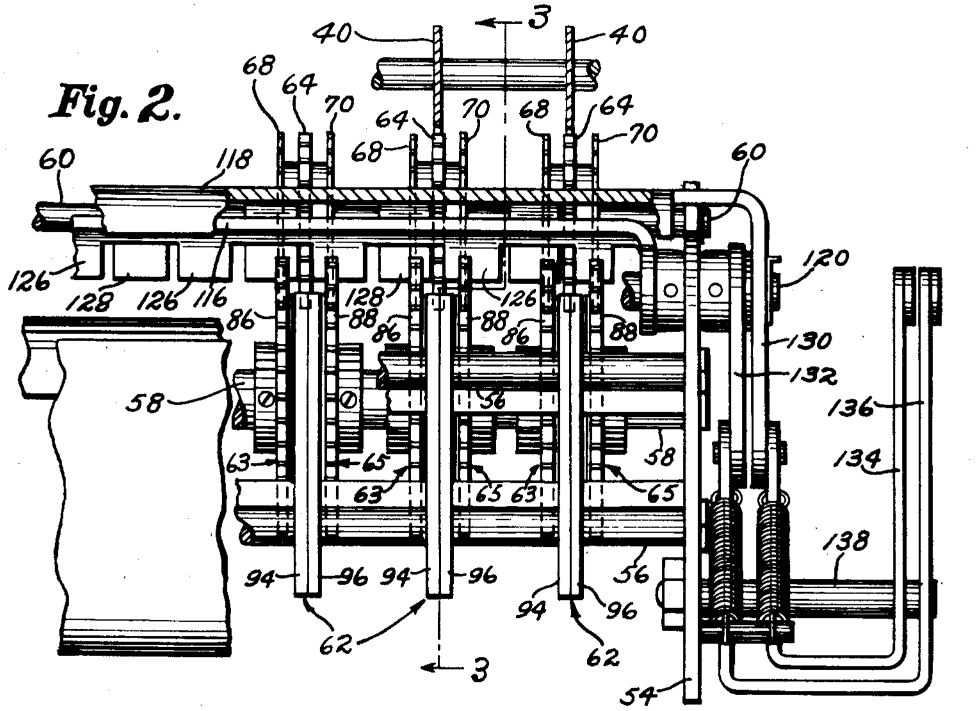
Fig. 2 is a cross sectional view of my improved rotary read-out device taken along line 2—2 of Fig. 1.

The detents 116 and 118 are individually operable and in the interests of compactness of the read-out devices are pivotally mounted on a common shaft 120. This shaft 120 extends between and is mounted on the casing end plates 54 above the top of the casing. Preferably, the detents 116 and 118 are in the form of bails that extend parallel and substantially coextensive of the shaft 120. As shown in Figs. 2 and 3, the detent 116 releasably holds all of the gears 88 and the detent 118 releasably holds all of the gears 86. In order that the detents 116 and 118 may be supported on the same shaft 120 and engage alternate ones of the gears 86 and 88, downturned edge portions are provided on the detents with staggered spaced apart fingers 126 and 128 respectively. End portions of the detent fingers 126 and 128 are downturned to engage between adjacent teeth of gears 88 and 86, respectively.

At one end of the read-out device casing, an extension of detent 118 is bent to provide an operating arm 130 and adjacent thereto is a similar operating arm 132 for detent 116. A pair of levers 134 and 136 of the bail type are respectively pivotally connected to the free ends of arm 130 and 132, and both levers are pivoted on a stud shaft 138 that is mounted on the casing end plate 54. The levers 134 and 136 are operable to pivot the detents 116 and 118 to release gears 86 and 88 and in a multiplying operation, the gears 86 and 88 are released alternately to first operate the multiplicand switch 63 and then the multiplier switch 65. This may be accomplished under the control of the carriage 24 by operatively connecting levers 134 and 136 respectively to respond to a program device that moves with the carriage 24. As is well known by those skilled in the art, the detent operating levers 134 and 136 may be operatively connected to program sensing levers of the type shown in Fig. 15 of the above mentioned Butler patent such that in one position of the carriage, the multiplicand switch 63 will be operated and in another position of the carriage, the multiplier switch 65 will be operated.

Figure 8A:
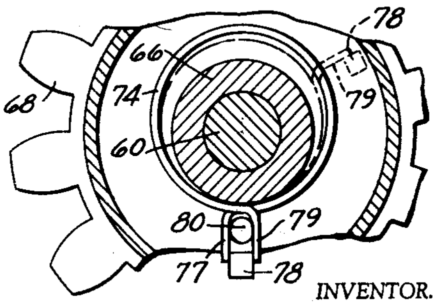
Fig. 8A is a sectional view similar to Fig. 8, taken along line 8A—8A of Fig. 7.

The following detail description of operation has reference only to one of the storage devices 20 since these devices are alike in operation. It can be assumed for purposes of this description that the aligned positions of the studs 78, 80 in Fig. 8A are their starting positions which, of course, means that the switch contacts 112, 114 of switch 63 are also in their starting positions. Further, it can be assumed that the multiplicand and multiplier to be stored and read out of the device 20 are "4" and "2" respectively. With the carriage in the multiplicand position the multiplicand "4" is indexed into the keyboard of the accounting machine and the motor bar actuated to effect a cycling operation of the accounting machine including movement of the amount rack 40 which moves to a position representative of the number "4." As the rack 40 moves to the number "4" position, the rack rotates the associated pinion 64 to a position corresponding to the number "4." At this time, both of the detents 118, 116 are in their spring biased released positions, respectively holding the switch gears 86 and 88 and therefore the gears 68 and 70 against rotation. As a consequence, rotation of pinion 64 to the "4" position stores forces in the springs 74 and 76 acting to move the gears 68 and 70 and thus the switch gears 86 and 88 to positions representative of the number "4." In storing the forces in the springs 74 and 76, the studs 78 and 82 on pinions 64 move the corresponding end portions 79 and 81 respectively of the springs 74 and 76 away from the other corresponding spring end portions 77 and 83, the latter spring end portions being restrained by the studs 80 and 84 of the detent locked gears 68 and 70 respectively, as shown in Figs. 8 and 8A. At this point, both of the springs 74 and 76 have been tensioned by the storing operation of the multiplicand "4." About half way of the movement of the rack 40 enroute to position "4," the timed operating mechanism of the accounting machine pivots the detent operating lever 134 and retracts the multiplicand detent 118 which releases switch gear 86 which is then rotated to the "4" position by the new released previously stored force in spring 74. When the detent 118 is retracted, the spring end portion 77 acting against the stud 80 rotates gear 68 until stud 80 engages the spring end portion 79 where the opposed spring forces become neutralized holding stud 80 in radial alignment at the "4" position with stud 78 in which position stud 80 now restrains spring end 79. The detent 118 is then released by the timed operating mechanism of the accounting machine to engage and hold gear 86 in the set "4" position. During this time, the multiplier switch spring 76 remains tensioned at the "4" position without function. The rack 40 now returns to its home position and in so doing rotates the pinion 64 back to its starting position. As the pinion 64 rotates back to its starting position, its stud 78 carries the spring end 77 back to home position, the other spring end 79 being held at the "4" position, as previously mentioned, by stud 80 under restraint of detent 118 engaging gear 86. Thus, the spring 74 is tensioned upon return of the rack 40 to home position. Also, when the rack 40 returns to home position, spring end 81 of the multiplier storage unit follows stud 82 back to home position. From the above, it will be understood that the multiplier storage device went through lost motion operations, or motions that performed no useful functions during the storage of the multiplicand "4;" and that all of its moving parts returned to home positions upon return of the rack 40 to starting position. The multiplicand "4," now stored in the switch 63, may be read out at this time or may be read out after the multiplier "2" has been stored, or may be read-out any time before a new multiplicand is indexed into the keyboard of the calculating machine.

The operation of storing the multiplier "2" is similar to the above described operation of storing the multiplicand "4" except that the carriage now being in the multiplier printing position, the timed detent operating mechanism of the accounting machine retracts the other detent 116, as the rack 40 is moving stud 82 to the multiplier "2" position. As a result, the end 83 of the tensioned spring 76 acting against stud 84 rotates the switch gear 88 to the "2" position where studs 82 and 84 are aligned by the spring tension acting in opposed relation against both of the studs. The detent 116 is now released by the timed detent operating mechanism to hold the switch gear 88 and therefore gear 70 locked in the "2" position and then the rack 40 returns to starting position which returns the pinion 64 until the pinion stud 82 is at the starting position. This movement tensions the spring 76 which is now acting to urge the detent held stud 84 to starting position. During the storing of the multiplier "2" the other spring 74 was tensioned by rotation of pinion 64, but since the multiplicand detent remains in locked position throughout the multiplier storage operation, the tensioning of spring 74 is a lost motion action, or is without function.

Following the reading out of the multiplicand "4" and the multiplier "2," new numbers may be stored in the storage device and without first clearing the previously stored numbers, or multiplicand "4" and multiplier "2." For example, with the multiplicand "4" and the multiplier "2" in the storage device, the switch gears 68 and 70 will be in the positions indicated in Figs. 8A and 8 or as represented by the positions of the spring ends 79 and 81 respectively, as shown in dot and dash lines. Assume that a new multiplicand say "2" is indexed into the calculating machine. When the machine cycles, the rack 40 will rotate pinion 64 to the "2" position and spring end portion 77 will follow under the tension of the spring. This means that stud 78 is now half way between home position and the position of stud 80 at the "4" position. As the rack 40 moves en route to the new number position "2," the detent 118 is retracted releasing spring 74, and spring end portion 79 acting on stud 80, rotates the switch gear 86 until stud 80 radially aligns with stud 78 on the "2" position. The detent 118 is now released to engage gear 86 to hold spring end 79 in the "2" position following which the rack 40 returns to its starting position. As the rack 40 returns to its starting position it rotates the pinion 64 in a corresponding direction and the pinion carried stud 78 moves spring end 77 back to home position which tensions spring 74 accordingly. The multiplicand "2" is now stored in the number storage device.

Assume that another multiplicand, larger than the set multiplicand "2," such as "6," is indexed into the rack 40. As before, the rack will move and rotate pinion 64, but this time the pinion carried stud 78 will pick up the spring end portion 79 at the "2" position and move it around to the "6" position. During this operation, detent 118 will be retracted, allowing gear 68 to follow under the action of spring 74. As this occurs, spring end 77 follows the stud 80 around until the stud 80 radially aligns with stud 78, or where the spring forces become neutralized at the "6" position. As before, the detent 118 is now released to engage gear 86 to hold the spring end 77 at the "6" position, and thereafter the rack 40 returns to its starting position. As the rack returns to starting position it rotates pinion 64 in the corresponding direction and the pinion carried stud 78 moves the spring end 77 back to home position. The same operations take place when new numbers or multipliers are indexed for storage in the device.

What is claimed is:

1. In a calculating machine having a switch arm movable to any one of a number of spaced contacts and an operator for moving the arm, a mechanism for operatively connecting the operator to the switch arm comprising supporting means, a pair of laterally positioned gears mounted for rotation on said supporting means, a pinion driven by the operator and disposed between said gears, said pinion having oppositely disposed hubs spacing said gears apart and rotatable relative thereto, a pair of torsion springs respectively within said hubs and respectively connecting said gears to said pinion, and a pair of separately operable detents normally holding said gears against rotation to store gear rotating forces in either of said springs by and upon rotation of said pinion.

2. In a digit storing device, supporting means, a shaft, a plurality of pairs of gears on said shaft relatively rotatable to positions indicative of different digits, a separate actuator for each pair of said pairs of gears, a second shaft parallel to the first, a bail pivoted on said second shaft extending substantially coextensive of said first shaft, said bail having detent fingers spaced longitudinally thereof and laterally extending from said second shaft to engage normally between the teeth of one of the pinions of each one of said pairs of gears to hold the engaged gears against rotation and a second bail pivoted on said second shaft and extending substantially coextensive of said first bail having detent fingers interposed respectively between said first fingers normally to engage and hold the other gear of each one of said pairs of gears against rotation, and separate operating means for each of said bails independently operable of each other.

3. A rotary digit storing device comprising, a pinion having a pair of concentric inner and outer hubs on each side thereof, a pair of gears mounted for rotation individually on said inner hubs on opposite sides of said pinion and cooperable with said hubs to form closed compartments, a bi-directional torsion spring in each of said compartments encircling said inner hub and each of said torsion springs operatively connecting said pinion and one of said gears, a pair of back to back printed circuit cards substantially coplanar with said pinion, a pair of gears substantially coplanar with and driven respectively by said first pair of gears, and switch means carried by each of said second pair of gears cooperable respectively with the printed circuits on said discs.

4. A rotary digit storing device comprising, a pinion naving on each side thereof a pair of concentric inner and outer hubs, a pair of gears mounted for rotation individually and respectively on said inner hub on opposite sides of said pinion and cooperable with said hubs to form closed chambers, a bi-directional torsion spring in each of said chambers encircling said inner hub and each of said torsion springs operatively connecting said pinion and one of said gears, a pair of back to back printed circuit cards substantially coplanar with said pinion, a pair of gears substantially coplanar with and driven respectively by said first pair of gears, switch means carried by each of said second pair of gears cooperable respectively with the circuits on said cards, and a pair of separately operable detents laterally positioned from said pinion and normally engaging between the teeth respectively of said second pair of gears to hold the gears against rotation during rotation of said pinion.

5. A device for effecting a delayed movement of a pair of individually operable switches by a single actuator comprising, a support, a pair of freely rotatable gears on said support for driving connection respectively with the switches, a single pinion freely rotatable on said support to be driven by the actuator, a pair of torsion springs encircling said support having one pair of the corresponding ends thereof operatively connected to said pinion and the other pair of the corresponding ends thereof operatively connected respectively to said gears, said springs on rotation of said pinion operable to store forces to rotate said gears, cooperating stop means on said pinion and gears, to limit rotation of said gears in accordance with rotation of said pinion, and individually operable holders normally holding said gears against rotation and retractable to release said gears.

6. A device for effecting a delayed movement of a pair of individually operable rotary switches by a single actuator comprising, a support, a pair of spaced rotatable gears on said support for respectively operating the switches, a single pinion freely rotatable on said support for rotation by the actuator, said pinion disposed between said gears and having oppositely directed hubs extending to and cooperating with the gears to form closed compartments on opposite sides of said pinion, a pair of torsion springs respectively disposed within said compartments, stops carried by and on opposite faces of said pinion engaged respectively by a pair of the corresponding ends of said springs, stops on each of said gears within said compartments engaged respectively by the other corresponding ends of said springs, said springs on rotation of said pinion operable to store forces acting to rotate said gears to positions limited by said stops, and individually retractable detents normally holding said gears against rotation.

7. In a device for storing two different numbers indexed into a machine in which an amount rack moves to one position indicative of one of the numbers and then moves to another position indicative of the other of the numbers, a casing, a shaft mounted on and within said casing, a pair of switch carrying gears rotatable on said shaft, a second shaft mounted on and without said casing above said first shaft, a pinion rotatable on said second shaft to be rotated by the rack in storing both of the numbers and having opposite directed hubs, a pair of gears rotatable respectively on said hubs on opposite sides of said pinion and in mesh respectively with said pair of switch carrying gears, separators spacing said second pair of gears from said pinion and cooperating therewith and with said hubs to formed closed compartments on opposite sides of said pinion, a pair of torsion springs respectively within said compartments operatively connecting said pinion individually to said second pair of gears, said springs on rotation of said pinion by the rack storing forces acting to rotate said second pair of gears, a shaft mounted on and without said casing laterally of said pinion, a pair of individually operable detents mounted on said last-named shaft normally restraining said springs, and means operable to release first one and then the other of said detents.

8. In a digit storing device, a shaft, a plurality of pairs of spaced gears rotatably mounted on said shaft for relative rotation to positions indicative of different value digits, a separate actuator for each pair of said pairs of gears, a second shaft parallel to and above said first shaft, an elongated member pivoted on said second shaft and extending substantially coextensive of said first shaft, said elongated member having detent fingers spaced longitudinally thereof and extending laterally therefrom to engage one of each of said pairs of gears normally to hold the engaged ones of said pairs of gears against rotation, a second elongated member rotatably mounted on said second shaft and extending substantially coextensive of said first elongated member, said second elongated member having a plurality of detents spaced apart longitudinally thereof and interposed respectively between said first detent fingers to engage and hold the other gears of each of said pairs of gears against rotation, and separate actuators for each of said elongated members.

References Cited in the file of this patent

UNITED STATES PATENTS 1,614,712 Cannon ---------------- Jan. 18, 1927